United States Patent Office 3,494,772
Patented Feb. 10, 1970

3,494,772
METHOD OF MAKING AN EDIBLE FIBROUS PROTEIN CASING
Noel James Bradshaw, Sharnbrook, Cornelius John Schram, Pavenham, and Albert Courts, Solihull, England, assignors to Lever Brothers Company, New York, N.Y., a corporation of Maine
No Drawing. Continuation-in-part of application Ser. No. 412,242, Nov. 18, 1964. This application Sept. 19, 1968, Ser. No. 761,405
Claims priority, application Great Britain, Apr. 24, 1964, 17,051/64
Int. Cl. A22c 13/00
U.S. Cl. 99—176                           8 Claims

ABSTRACT OF THE DISCLOSURE

An edible food casing such as sausage casing is prepared by swelling and subsequently deswelling an edible fibrous collagen and then combining it with an edible polysaccharide having ionic groups in its molecule and extruding an aqueous suspension thereof into a precipitating bath.

---

This application is a continuation-in-part of application Ser. No. 412,242 filed on Nov. 18, 1964 now abandoned.

This invention relates to casings and particularly to artificial edible food casings.

Sausage casing is an example of an edible food casing and is conventionally made from animal intestine (the so-called 'natural casings'). In practice, natural casings suffer from a number of disadvantages: for example, they require careful cleaning and preparation, are irregular in diameter and are in short supply and are rather expensive.

Artificial edible sausage casings, that is, casings which are not obtained from the natural intestine, have been made, but it has been found difficult to make a casing having a suitable degree of shrinkage when it is cooked, for example by frying or boiling. On cooking, sausage meat decreases in volume by about 15%, and it is desirable that the sausage casing should shrink by an amount sufficient to keep it in contact with the sausage meat; on the other hand, shrinkage should not be so great that the casing is split and releases the meat.

We have now found that an improved casing may be prepared, comprising an edible fibrous collagen protein and an edible alginate in combination with the swelling treatment.

The casings of the invention comprise a continuous phase of alginate containing a net-work of collagen fibres. This structure is attained by the extrusion of a preformed mixture of the materials, in which the alginate has acted on and combined with the collagen. The modified collagen fibres so formed are readily extruded, aided by the lubricating action of the alginate in the extrusion die, and form a homogeneous and strong casing.

The concept of the invention is to prepare a mixture of two materials, collagen and alginate, in which each of the components modifies the other with respect to the properties shown during extrusion and in the final casing.

Casings on which alginate is present by application after extrusion and for post-extrusion purposes not incorporated in a pre-mix, have been proposed, as in Patent No. 2,988,451 to Zahn and Patent No. 3,123,483 to McKnight. Zahn is interested in the production of sausage casings which are readily removable, for use on those kinds of sausages where the casing is not eaten with the sausage. He applies alginate to a casing formed by extrusion of an unmodified collagen dough, applying at most 3% of alginate with respect to the collagen. His alginate forms a layer on the collagen on the inside of the casing which prevents adhesion of the casing to the meat of a sausage and makes possible ready stripping. Apart from this essential difference of applying a layer of alginate to a formed casing of unmodified collagen the amount applied is such that if the same amount was incorporated in the pre-mixing stage which is an essential characteristic of the invention then it would have no useful effect. A minimum of 10% alginate is required in the process of the invention. Such an amount of alginate is sufficient to modify the whole of the collagen to a noticeable and useful extent, though of course it is preferred to use higher amounts, up to 60% related to the collagen.

McKnight discloses the use of carboxymethylcellulose applied to an already formed collagen casing. Carboxymethylcellulose is in some respects a comparable material to alginate, but essential differences exist such, for example, as the fact that alginate, containing carboxylic acid groups, would be precipitated at low pH's such as those of lactic acid swollen collagen in a manner that carboxymethylcellulose would not. A workable dough of the kind McKnight discloses would therefore not be preparable using the alginate of the invention. Moreover McKnight refers to a layer effect, quoting for example a 3 mμ layer on the casing. A typical thickness for the casings of the invention is two-thousandths of an inch (50 mμ) and accordingly McKnight is applying only a small proportion of carboxymethylcellulose and as already noted such a proportion would have no effect on the process of the invention. McKnight states that the carboxymethylcellulose would migrate into the wall of the collagen tube and to a greater or lesser extent be present through the entire wall of the casing, but nevertheless apart from the differences between carboxymethylcellulose and alginate a modification of the kind achieved by pre-mixing before extrusion could not be achieved by after treatment of already extruded casing, said casing having been set in the usual setting solutions used with collagen. The molecular accessability and reactivity of collagen in the hydrated swollen form of a dough is far greater than in the dehydrated and cohered form of a set casing and the invention makes use of this.

In the work leading to the invention we extruded casings from collagen itself, a matter of great difficulty, which were tough to eat and on frying tended to split and shrink and extrude the meat. We also extruded casings consisting solely of alginate. Such casings were extremely easy to extrude, in great contrast to the difficulty experienced with collagen dough itself, but gave casings which were baggy on the sausage and unattractive in appearance and other properties. Only in combining the properties of the two materials before extrusion did we get a material in which the difficult properties of the collagen in extrusion were modified by the alginate and the undesirable properties of the alginate in cooking were modified by the collagen, to give a casing which, as is desirable, shrank with the meat during cooking, but not so much that splits or extrusion of meat occurred.

These are the advantages of the process and of the casing produced and are attributable to the collagen/alginate interaction and structure.

The fibrous protein is present in the casing conveniently in the form of fibres having an average length of from 5 to 25 mm. Preferably the fibres have a length of from 10 to 22 mm. The diameter of a single fibre is preferably not greater than 0.1 mm.

The polysaccharide may be subjected to treatment prior to its addition to the protein to incarese the number of its reactive (ionic) groups.

The proportion of fibrous protein to polysaccharide in the casing is preferably within the range from 90:10 to 40:60; a particularly suitable protein:polysaccharide ratio is from 70:30 to 50:50, all these proportions being expressed on a dry weight basis.

Conveniently the casing is obtained by mixing together an aqueous slurry of the protein and a solution or suspension of the alginate, extruding the mixture so obtained to the desired form, and then setting or hardening the mixture in some way, suitably by use of a calcium precipitating agent for the alginate, so that the form of the casing is retained.

A preferred method of making casings according to the invention is as follows: a source of collagen is washed and bleached, and is then minced and milled down to a paste in which the fibres are dispersed to the required degree. During this process it is advisable to keep the temperature of the collagen below 40° C., preferably below 25° C., to minimise denaturation. The milled collegen is then dispersed in a solution of sodium alginate, and homogenised to shear the collagen bundles to the required dimensions. This process also promotes chemical interaction between the collagen and the alginate. The collagen/alginate mixture is then extruded through a suitable annular nozzle into a setting solution. A particularly suitable setting solution contains di- or trivalent metal ions which are able to bring about precipitation of the alginate as an insoluble salt. The preferred setting agent is a solution of calcium chloride. The formed casing is then inflated by air to assist further processing and, after washing to remove excess setting solution, the casing is dehydrated to a moisture content of 10% to 50%.

In the process of the invention the fibrous protein is swollen, preferably prior to admixture with the alginate. By "swollen" we mean that the diameter of the protein fibre is increased. Suitable swelling agents include organic acids, for example citric and lactic acids. The swelling treatment is usually carried out at a temperature below the shrinkage temperature of the fibrous protein, and preferably below 25° C. The duration of the swelling treatment varies with the conditions employed, but it is normally from ½ to 24 hours.

Acid swelling is carried out before admixture with the alginate. After treatment with an acid swelling agent, the protein suspension is preferably milled again, for example in a colloid mill, in the acid swollen condition. Before being mixed with the alginate, the pH is preferably adjusted to reduce the degree of swelling of the protein.

Alkaline swelling of the protein may be brought about either before or after admixture with the alginate. After alkaline swelling the protein may be milled again and the pH adjusted so as to reduce the degree of swelling of the protein, or the protein may be mixed with the alginate while still in the alkali-swollen condition. When swelling of the protein is brought about after admixture with the alginate the swelling agent employed for the swelling step is an alkaline one, for example sodium hydroxide. Alkaline swelling agents have a rather different effect on the protein than do acidic agents; the breakdown of the sheaths around the fibre bundles is different and the resulting product has a more translucent appearance.

If swelling is carried out after admixture of the protein with the alginate the mixture may be submitted to comminution after swelling and before extrusion.

The swelling treatment has been found to assist the production of a homogeneous mix for extrusion, and it also assists the production of protein fibres of suitable dimensions, particularly when the protein suspension is submitted to further comminution after the swelling treatment.

Although the invention relates particularly to casings such as food casings, it is believed that compositions comprising fibrous protein and alkinate as hereinbefore described are novel, and accordingly the invention is to be understood to include all such compositions.

The invention is further illustrated by the following examples.

EXAMPLE 1

Trimmed cattle-hide limed tannery splits were thoroughly washed with sodium hypochlorite solution (0.02%) and 2 kilograms of the washed material (12% solids) were reduced to collagenous paste by passing them once through a high speed mincer and three times through a colloid mill set to progressively finer clearance, the last being a 0.05 mm. gap. The collagen was kept cool during the milling. The collagen paste so obtained was then mixed with 6 kilograms of 4% sodium alginate solution in water, first in a Lang disintegrator for 5 minutes and then in a colloid mill. The mixture was deaerated for 10 minutes at 70 mm. Hg and extruded vertically upwards at 400 grams per minute through an annulus 25 mm. in diameter and 0.6 mm. wide.

The casing was set by means of a bath of 12% calcium chloride (aqueous) solution, which bathed the casing both inside and out. On passing from the setting solution, the casing was inflated to a diameter of 30 mm. using air at a pressure of 32 gm./sq. cm.

A constant level of calcium chloride solution was maintained in the setting bath by replacement of the solution as it was removed with the casing. The inflated casing was drawn away from the nozzle by a conveyor belt, and was washed with water from overhead sprays.

Lengths of the casing were wound in an open spiral round a reel of 27 cm. diameter, inflated and dried in a current of air at 40° C. and 200 to 300 m. per minute, for 15 minutes. It was then transferred for conditioning to a humidity cabinet maintained at 85% relative humidity and 20° C. After about 4 hours the casing reachd an equilibrium moisture content of 30 to 35% and was spooled and ready for shirring and stuffing with sausage meat.

EXAMPLE 2

Tannery splits from cattle hide were washed and reduced to collagenous paste as described in Example 1. After passing through the colloid mill, the collagenous paste was diluted to about 3% solids with citric acid solution, giving a paste having a pH of 3.5. Treatment with the citric acid was carried out at 21° C., and lasted 18 hours. The translucent paste so obtained was then passed again to the colloid mill and there submitted to further comminution.

The pH of the paste was then adjusted to 9.0, and the collagen was concentrated and washed in a centrifuge to about 11% solids. The alkaline paste so obtained was diluted to 4% solids and mixed with an equal volume of a neutral 4% solution of sodium alginate. The mixture was deaerated and extruded and washed as before.

EXAMPLE 3

The process of Example 2 was repeated, except that the swelling agent employed was a dilute solution of sodium hydroxide, which was added to the collagenous paste in an amount sufficient to reduce the total solids content of the paste to about 2.5% and raise its pH to 10.5. Swelling was again carried out at 10° C. for 18 hours. The paste so obtained was then passed again through a colloid mill, washed, adjusted to pH 9.0, and concentrated to 11% solids before mixing the sodium alginate solution and extruding as before.

The dry casing obtained was more translucent than that obtained by the process of Example 2.

EXAMPLE 4

Tannery splits from cattle hide were washed, reduced to collagenous paste and swelled in alkali at pH 12, but after the swelling treatment the paste was mixed with an equal volume of 3% sodium alginate solution at pH 7, and milled in a colloid mill. After milling, the mix was deaerated and extruded into 12% calcium chloride solution (which was slightly acidified with hydrochloric acid). The casing was washed and dried as before.

EXAMPLE 5

Tannery splits from cattle hide were washed and reduced to collagenous paste as described in Example 1.

After passing through the colloid mill, the collagenous paste was diluted to 3% solids with a solution of sodium hydroxide, and the alkaline paste so obtained mixed with an equal volume of a 3% sodium alginate solution. The collagen/alginate mixture had a pH of 11, and was held at 10° C. for 18 hours to bring about swelling of the collagen. The mixture was then milled, deaerated and extruded into 12% calcium chloride solution, and the casing so formed was washed and dried as in Example 1.

We claim:
1. A method of making a homogeneous edible fibrous protein casing which comprises the steps of
   (i) treating a comminuted edible fibrous collagen protein with an edible organic acid swelling agent,
   (ii) de-swelling the protein by adjusting its pH,
   (iii) mixing the protein with an edible alginate causing chemical interaction between the protein and alginate, the proportions of protein to alginate being in the range 90:10 to 40:60 on a dry weight basis, and
   (iv) forming the casing by extrusion of the mixture of protein and alginate into a calcium precipitating bath.

2. A method of making a homogeneous edible fibrous protein casing which comprises the steps of
   (i) treating a comminuted edible fibrous collagen protein with an edible alkaline swelling agent,
   (ii) mixing the protein with an edible alginate causing chemical interaction between the protein and alginate, the proportions of protein to alginate being in the range 90:10 to 40:60 on a dry weight basis,
   (iii) de-swelling the protein by adjusting the pH of the mixture,
   (iv) forming the casing by extrusion of the mixture of protein and alginate into a calcium precipitating bath.

3. A method of making a homogeneous edible fibrous protein casing which comprises the steps of
   (i) treating a comminuted edible fibrous collagen protein with an edible alkaline swelling agent,
   (ii) de-swelling the protein by adjusting its pH,
   (iii) mixing the protein with an edible alginate causing chemical interaction between the protein and alginate, the proportions of protein to alginate being in the range 90:10 to 40:60 on a dry weight basis, and
   (iv) forming the casing by extrusion of the mixture of protein and alginate into a calcium precipitating bath.

4. A method according to claims 1, 2 or 3, in which the proportion is 70:30 to 50:50.

5. A method according to claims 1, 2 or 3, in which the fibrous collagen protein is present in the form of fibres having an average length of 5 to 25 mm.

6. A method of making a homogeneous edible fibrous protein casing which comprises the steps of
   (i) comminuting edible collagen protein in the presence of an organic acid swelling agent for the protein to provide comminuted edible fibrous collagen,
   (ii) de-swelling the protein by adjusting its pH,
   (iii) mixing the protein with an edible alginate, the proportions of protein to alginate being in the range 90:10 to 40:60 on a dry weight basis, and
   (iv) forming the casing by extrusion of the mixture of protein and alginate into a calcium precipitating bath.

7. A method of making a homogeneous edible fibrous protein casing which comprises the steps of
   (i) comminuting edible collagen in the presence of an edible alkaline swelling agent to provide a comminuted fibrous collagen protein,
   (ii) mixing the protein with an edible alginate, the proportions of protein to alginate being in the range 90:10 to 40:60 on a dry weight basis,
   (iii) de-swelling the protein by adjusting the pH of the mixture,
   (iv) forming the casing by extrusion of the mixture of protein and alginate into a calcium precipitating bath.

8. A method of making a homogeneous edible fibrous protein casing which comprises the steps of
   (i) comminuting edible collagen in the presence of an edible alkaline swelling agent to provide a comminuted fibrous collagen protein,
   (ii) de-swelling the protein by adjusting its pH,
   (iii) mixing the protein with an edible alginate, the proportions of protein to alginate being in the range 90:10 to 40:60 on a dry weight basis, and
   (iv) forming the casing by extrusion of the mixture of protein and alginate into a calcium precipitating bath.

References Cited

UNITED STATES PATENTS

| | | | |
|---|---|---|---|
| 2,897,547 | 8/1959 | Weingand | 99—176 X |
| 3,071,477 | 1/1963 | Klevens | 99—176 |
| 3,223,551 | 12/1965 | Tu. | |
| 3,306,754 | 2/1967 | Kielsmeier et al. | 99—176 X |

OTHER REFERENCES

Mantell, "The Water-Soluble Gums" 1947, published by the Reinhold Publishing Corporation, New York, page 114.

HYMAN LORD, Primary Examiner

U.S. Cl. X.R.

99—175